US012638117B2

(12) United States Patent (10) Patent No.: US 12,638,117 B2
Arisato (45) Date of Patent: May 26, 2026

(54) COUPLING DEVICE

(71) Applicant: KOSMEK LTD., Kobe (JP)

(72) Inventor: Akira Arisato, Kobe (JP)

(73) Assignee: KOSMEK LTD. (JP)

( * ) Notice: Subject to any disclaimer, the term of this patent is extended or adjusted under 35 U.S.C. 154(b) by 243 days.

(21) Appl. No.: 18/682,737

(22) PCT Filed: Aug. 4, 2022

(86) PCT No.: PCT/JP2022/029945
§ 371 (c)(1),
(2) Date: Jan. 31, 2025

(87) PCT Pub. No.: WO2023/022008

PCT Pub. Date: Feb. 23, 2023

(65) Prior Publication Data

US 2025/0164048 A1 May 22, 2025

(30) Foreign Application Priority Data

Aug. 18, 2021 (JP) ................................. 2021-133688

(51) Int. Cl.
*F16L 37/32* (2006.01)
*F16L 29/04* (2006.01)
(52) U.S. Cl.
CPC ............... *F16L 37/32* (2013.01); *F16L 29/04* (2013.01)

(58) Field of Classification Search
CPC ............ F16L 29/04; F16L 37/32; F16L 37/34
See application file for complete search history.

(56) References Cited

U.S. PATENT DOCUMENTS 6,644,331 B2    11/2003  Arisato
2012/0241021 A1   9/2012  Nick

FOREIGN PATENT DOCUMENTS

JP          60-67042        4/1985
JP          2000-346266     12/2000
JP          2003-117748     4/2003
JP          2006-17196      1/2006
JP          2021-102995     7/2021

*Primary Examiner* — Hailey K. Do

(74) *Attorney, Agent, or Firm* — Merek, Blackmon & Voorhees, LLC

(57) ABSTRACT

Provided is a compact coupling device. This coupling device has a first joint and a second joint. In the second joint, a sub valve chamber and a main valve chamber are formed so as to be continuous in the vertical direction. A sub valve member is inserted into the sub valve chamber so as to be movable in the vertical direction in a sealed manner. The sub valve member is urged downward by a second valve-closing spring against a sub valve seat formed inside the sub valve chamber. A communication path is formed in the sub valve member. The communication path forms a part of a flow passage that causes the sub valve chamber and the main valve chamber to communicate.

4 Claims, 6 Drawing Sheets

COUPLING DEVICE

TECHNICAL FIELD

The present invention relates to a coupling device for separably connecting a supply and discharge path formed in a first joint and a second joint.

BACKGROUND

A coupler of this type has been described in Patent Document 1 (Japan, Japanese Patent Application Publication No. 60-67042) and Patent Document 2 (Japan, Japanese Patent Application Publication No. 2003-117748). The prior art is configured as follows.

A coupling of Patent Document 1 includes a male plug and a female plug. An inlet/outlet valve and a main valve are provided in series in a plug case of the female plug. A flow passage for communicating a valve chamber of the inlet/outlet valve with a valve chamber of the main valve is provided inside the plug case and radially outside the valve chambers. A ring-shaped protective filter is mounted in an annular space formed in the middle of the flow passage.

A quick joint of Patent Document 2 has a plug as a first joint and a socket as a second joint. A second flow passage and a check valve chamber are provided in series in a housing of the plug. A second closing member is inserted into the second flow passage, and a check member is inserted into the check valve chamber. A flow passage communicating the second flow passage with the check valve chamber is formed in the housing and radially outside the second closing member. A cylindrical filter is mounted to the flow passage.

PRIOR ART LITERATURE

Patent Literature

Patent Document 1: Japanese Patent Application Publication No. 60-67042
Patent Document 2: Japanese Patent Application Publication No. 2003-117748

DISCLOSURE OF THE INVENTION

Problems to be Solved by the Invention

In the female plug of the coupling of Patent Document 1, a flow passage communicating the valve chamber of the main valve with the valve chamber of the inlet/outlet valve is formed outside the valve chambers, and a filter is mounted on the middle of the flow passage. Therefore, the radial dimension of the female plug is increased by the distance of the flow passage or the filter.

In the plug of the quick joint of Patent Document 2, a flow passage for communicating the second flow passage and the check valve chamber is formed radially outward of the second closing member, and a cylindrical filter is mounted on the middle of the flow passage. Thus, the radial dimension of the plug is increased by the distance of the flow passage and filter.

Diameters of the coupling devices (coupling, quick joint, etc.) of Patent Document 1 and Patent Document 2 are generally small, for example, about 20 mm. There is a need to maintain or increase the flow rate of fluid that can flow through the small coupling device while making its overall size more compact than conventional coupling devices.

It is an object of the present invention to provide a compact coupling device.

Means to Solve the Problem

To achieve the above object, the present invention, for example, as shown in FIGS. 1-3, 4-6, has configured a coupling device as follows.

The coupling device includes a first joint 3 and a second joint 4 detachably connected to the first joint 3. A first supply/discharge passage 5 is provided in the first joint 3. A second supply/discharge passage 6 detachably connected to the first supply/discharge passage 5 is provided. A sub valve chamber 27 and a main valve chamber 28 are formed in the second joint 4 so as to continue from the distal end side to the proximal end side in the axial direction. A sub valve member 33 is inserted into the sub valve chamber 27 so as to be movable in the axial direction via a sealing member 34 in a sealed manner. The sub valve member 33 is urged toward the distal end side toward a sub valve seat 32 formed in the sub valve chamber 27 by a second valve-closing spring 40. The sub valve member 33 has a sub valve surface 41 capable of coming into contact with the sub valve seat 32. A main valve member 43 is inserted into the main valve chamber 28 so as to be movable in the axial direction in a sealed manner. The main valve member 43 is capable of coming into contact with the sub valve member 33. The main valve member 43 is also urged toward the distal end side toward the main valve seat 42 formed in the main valve chamber 28 by a third valve-closing spring 48. A communication path 35 as a part of the second supply/discharge passage 6 is formed in the sub valve member 33.

The present invention provides the following working effects.

In the coupling device of the present invention, the communication path as a part of the second supply/discharge passage is formed in the sub valve member. Thus, the coupling device of the present invention can be made compact as compared with the conventional coupling device in which the communication path for communicating the sub valve chamber with the main valve chamber is formed outside the valve chamber.

The present invention applies the following configurations (1) to (3):

(1) For example, as shown in FIGS. 1 to 3 and 4 to 6, one end of the communication path 35 is opened on the outer peripheral surface of the sub valve member 33 between the sub valve surface 41 and a portion sealed by the sealing member 34. The other end of the communication path 35 is communicated to the sub valve chamber 27 between the sub valve member 33 and the main valve member 43.

In this case, the communication path is formed in the sub valve member which is inserted into the sub valve chamber. In other words, the communication path is formed so as to be accommodated in the sub valve chamber. Also, two spaces (a space sealed by the sealing member and the sub valve surface and the sub valve seat, and a space formed by the communication path between the sub valve member and the main valve member, which are partitioned by the inner peripheral surface of the sub valve chamber and the outer peripheral surface of the sub valve member) are also provided so as to be accommodated in the sub valve chamber. Thus, the coupling device of the present invention can be made compact as compared with the aforementioned conventional coupling device in which the communication path is formed outside the valve chamber.

(2) A filter 38 is mounted in the middle of the communication path 35.

In this case, the communication path and the filter can be accommodated in the sub valve member inserted into the sub valve chamber. Thus, the coupling device of the present invention can be made compact as compared with the conventional coupling device in which a communication path and a filter are provided outside the valve chamber.

(3) A support member 36 protruding from the wall surface of the communication path 35 supports a disc-shaped filter 38. The sub valve member 33 is capable of coming into contact with the main valve member 43 via the support member 36 and the filter 38.

In this case, in the disc-shaped filter, a supported portion of the filter, such as a portion being in contact with the support member (hereinafter supported portion), does not perform a function of removing foreign matter. Thus, by minimizing the portion of the support member supporting the filter as much as possible, the overall dimensions of the coupling device can be reduced. In the coupling device of the present invention, only the outer peripheral edge portion and the supported portion of the filter do not perform the function of removing foreign matter. Therefore, compared with the prior art (Patent Document 1), which requires a central opening and inner and outer peripheral edge portions of the central opening, the present invention does not require a margin for pressing the inner peripheral edge portion of the conventional art, thus the overall dimensions of the coupling device can be reduced.

DETAILED DESCRIPTION OF THE INVENTION

A first preferred embodiment of the present invention will now be described with reference to FIGS. 1 to 3.

Figure 1:
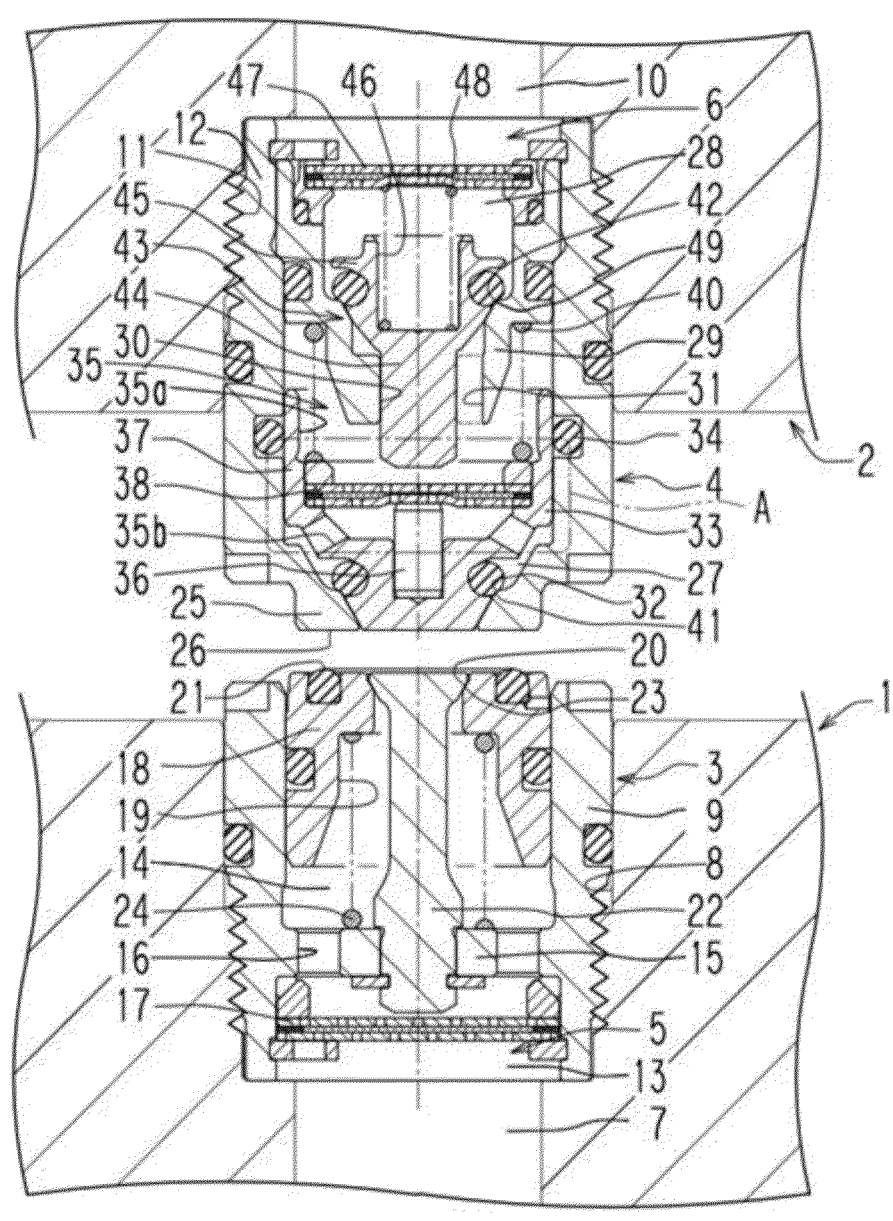
FIG. 1 is a cross-sectional view of a first preferred embodiment of the present invention in which a first joint and a second joint of a coupling device are separated.
Figure 2:
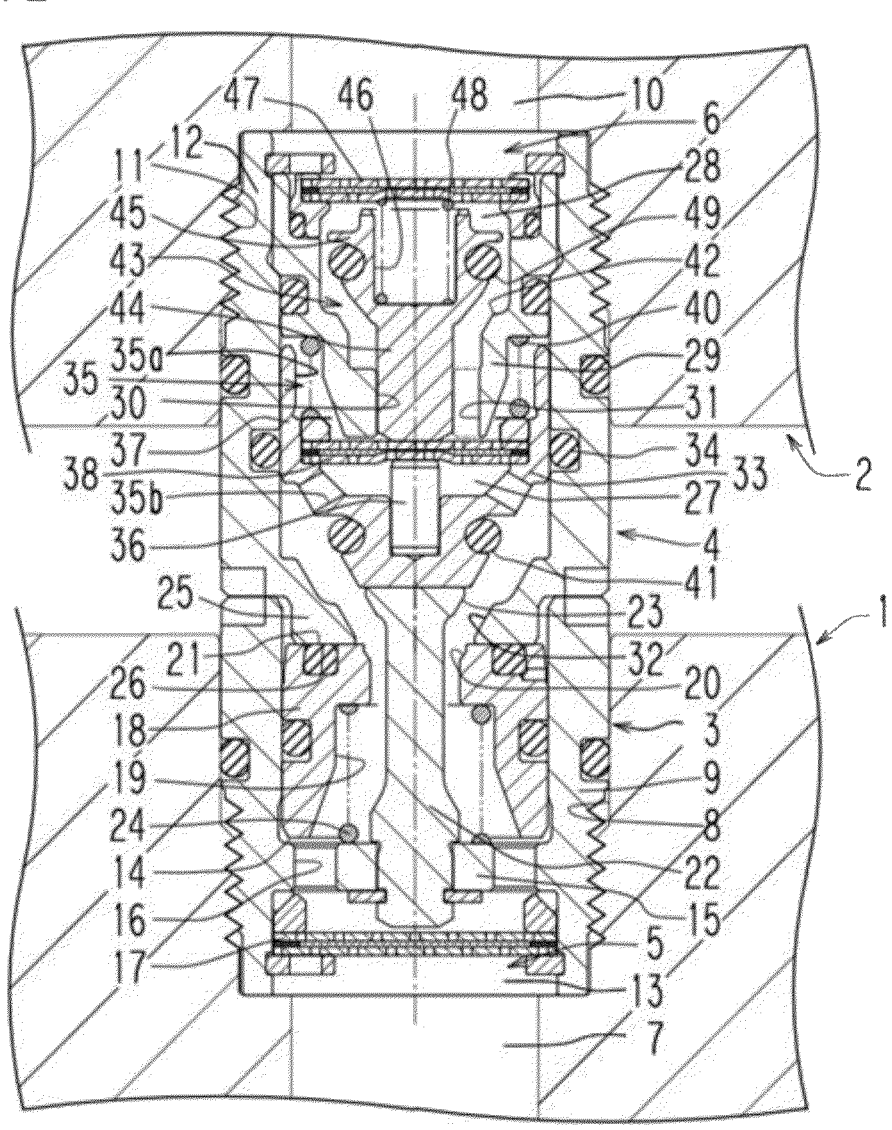
FIG. 2 is a cross-sectional view showing a state in which a first joint and a second joint of a coupling device are connected, and is similar to FIG. 1.
Figure 3:
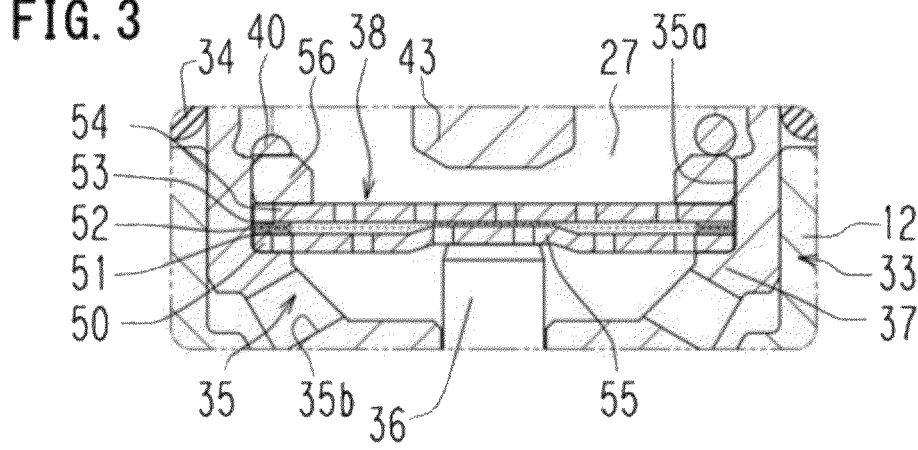
FIG. 3 is a partial enlarged view of a portion A shown in FIG. 1.

The coupling device shown in FIGS. 1 and 2 includes a first joint 3, and a second joint 4 that is detachably connected to the first joint 3 from the distal end side. A first supply/discharge passage 5 provided in the first joint 3 and a second supply/discharge passage 6 provided in the second joint 4 are separably connected.

A compressed air (pressure fluid) flow passage 7 formed in a first block 1 communicates with a mounting hole 8 opened on the upper surface of the first block 1. A first casing 9 of the first joint 3 is screwed into the mounting hole 8 in a sealed manner. A compressed air flow passage 10 is formed in the second block 2, and communicates with a mounting hole 11 opened in a lower surface of the second block 2. A second casing 12 of the second joint 4 is inserted into the mounting hole 11 in a sealed manner.

In the first joint 3 of the coupling device, a supply/discharge port 13 is formed by a hole opened in the lower surface of the first casing 9, and a first valve chamber 14 is formed on the upper portion of the first casing 9. The first valve chamber 14 and the supply/discharge port 13 are separated by a partition wall 15 and communicated by six through holes 16 (only two through holes 16 are shown in FIGS. 1 and 2) formed in the partition wall 15.

A first filter 17 is mounted on the inner peripheral wall of the supply/discharge port 13 so as to cover the supply/discharge port 13. According to this, foreign matter such as dust contained in compressed air from a supply source is removed by the first filter 17.

A cylindrical first valve member 18 is inserted into the first valve chamber 14 so as to be movable in a vertical direction in a sealed manner. The upper inner peripheral wall of a cylindrical hole 19 of the first valve member 18 is formed in a tapered shape so as to expand toward the upper side (distal end side). A first valve surface 20 is annularly formed on the tapered portion. A groove is circumferentially opened on the distal end surface of the first valve member 18 outside the first valve surface 20, and an annular sealing member 21 is mounted in the groove.

A substantially cylindrical valve seat member 22 protrudes upward into the first valve chamber 14 from the partition wall 15 in the first casing 9. The upper portion of the valve seat member 22 is tapered so as to extend upwardly. A first valve seat 23 is circumferentially formed on the tapered surface of the valve seat member 22. The first valve surface 20 is allowed to abut or come into contact with the first valve seat 23.

A first valve-closing spring 24 is mounted between the cylindrical first valve member 18 and the partition wall 15, and urges the first valve member 18 upwardly toward the distal end portion of the seat member 22.

In this embodiment, the first supply/discharge passage 5 is composed of the supply/discharge port 13 of the first casing 9, the through-hole 16, the first valve chamber 14, and the cylindrical hole 19 of the first valve member 18.

The above-mentioned second joint 4 is configured as follows. A plug portion 25 is formed integrally with the second casing 12 of the second joint 4 so that the plug portion 25 protrudes downward from the second casing 12, and a receiving surface 26 is formed on the lower surface of the plug portion 25. The receiving surface 26 is capable of coming into contact with the sealing member 21 mounted on the first valve member 18 of the first joint 3. The plug portion 25 can be inserted into the first valve chamber 14 of the first joint 3.

A second valve chamber (sub valve chamber) 27 and a third valve chamber (main valve chamber) 28 are formed in order from the lower side in the above-mentioned second casing 12. The second valve chamber 27 and the third valve chamber 28 are separated by a partition wall 29 formed in the second casing 12. A guide hole 30 passing through the center of the partition wall 29 communicates the second valve chamber 27 with the third valve chamber 28. A communication groove 31 is vertically formed on the peripheral wall of the guide hole 30. The second valve chamber 27 is opened to the lower surface of the plug portion 25. The third valve chamber 28 is opened to the upper surface of the second casing 12.

A second valve seat (sub valve seat) 32 is formed circumferentially on the inner peripheral wall near the opening of the second valve chamber 27 so as to become narrow as it goes downward (closer to the axial center). A second valve member (sub valve member) 33 is inserted into the second valve chamber 27 by a sealing member 34 so as to be movable in a vertical direction (an axial direction of the second casing 12) in a sealed manner. A recess 35*a* is formed on the upper part of the second valve member 33, and a support pin (support member) 36 protrudes upward from the bottom wall. A stepped portion 37 is provided on the inner peripheral wall of the recess 35*a*, a disk-shaped second filter (filter) 38 is mounted on the stepped portion 37, and the central portion of the second filter 38 is supported from below by the support pin 36. A chamber partitioned by the inner peripheral wall of the recess 35*a* and the second filter 38 communicates with a chamber partitioned by the outer peripheral surface of the second valve member 33 and the inner peripheral surface of the second valve chamber 27 through six through holes 35*b* (only two through holes 35*b* are shown in FIGS. 1 to 3) on the cylindrical wall of the second valve member 33. Here, the communication path 35 is formed by the recess 35*a* and the through holes 35*b*. In addition, the through holes 35*b* are opened to the outer peripheral surface of the second valve member 33. More specifically, the opening formed by each through hole 35*b* is opened from the sealing portion on the outer peripheral surface of the second valve member 33 being in contact with the sealing member 34 to a second valve surface 41 described below. A second valve-closing spring or sub valve member closing spring 40 is mounted between the partition wall 29 and the step portion 37 of the recess 35*a* via the second filter 38, and the second valve-closing spring or sub valve member closing spring 40 urges the second valve member 33 with respect to the partition wall 29 downward toward the second valve seat 32. A tapered surface is formed on the lower outer peripheral wall of the second valve member 33, and the accommodation groove is circumferentially opened on the tapered surface. A sealing member is mounted on the accommodation groove, and a second valve surface (sub valve surface) 41 is formed by the outer peripheral surface of the sealing member. The second valve face 41 is capable of coming into contact with the second valve seat 32.

The lower portion of the inner peripheral wall of the third valve chamber 28 is formed in a tapered shape so as to become narrow as it goes downward (closer to the axis), and a third valve seat (main valve seat) 42 is circumferentially formed on the tapered surface. A third valve member (main valve member) 43 is inserted into the third valve chamber 28 so as to be movable in the vertical direction (the axial direction of the second casing 12) in a sealed manner. The third valve member 43 has a cylindrical portion 44 and a tapered portion 45 in order from the lower side. The cylindrical portion 44 is movably inserted into the guide hole 30. The lower end surface (tip surface) of the cylindrical portion 44 is capable of coming into contact with the center portion of the second filter 38 at a predetermined interval. Also, the tapered portion 45 is formed so as to extend toward the upper side. A recess 46 is formed on the upper portion of the third valve member 43. A third valve-closing spring or main valve member closing spring 48 is mounted between the bottom wall of the recess 46 and a disc-shaped third filter 47 mounted on the inner peripheral wall of the second casing 12. The third valve-closing spring or main valve member closing spring 48 urges the third valve member 43 with respect to the second casing 12 downward toward the third valve seat 42. An accommodation groove is formed circumferentially on the outer peripheral wall of the tapered portion 45 of the third valve member 43. A sealing member is mounted in the accommodation groove, and a third valve surface 49 is formed on an outer peripheral surface of the sealing member. In this embodiment, the lower end surface of the cylindrical portion 44 is spaced a predetermined distance from the center portion of the second filter 38 in a state where the second valve surface 41 is engaged with the second valve seat 32 and the third valve surface 49 is engaged with the third valve seat 42. However, in the above state, the lower end surface of the cylindrical portion 44 may be in contact with the center portion of the second filter 38.

As previously described, the third valve-closing spring or main valve member closing spring 48 is mounted between the third valve member 43 and the thin third filter 47. Therefore, it is necessary to prevent the third filter 47 from being plastically deformed or damaged by urging force of the third valve-closing spring 48. Accordingly, the maximum urging force of the third valve-closing spring or main valve member closing spring 48 is set sufficiently smaller than the maximum urging force of the second valve-closing spring or sub valve member closing spring 40. However, in certain cases, it is also necessary for the third valve-closing spring or main valve member closing spring 48 to push the third valve member 43. Thus, it is necessary to set the urging force of the third valve-closing spring or main valve member closing spring 48 to an extent that exceeds resistance force such as self-weight of the third valve member 43 and sliding resistance.

The second filter 38 and the third filter 47 are configured to be substantially the same. The configuration will be described with reference to FIG. 3, which shows the second filter 38. The filter 38 includes a lower support member 50, a lower spacer 51, a grid 52, an upper spacer 53, and an upper support member 54, which are provided in order from the lower side. The lower support member 50 is a disc-shaped plate and has a plurality of circular holes (so-called punching metal). The lower support member 50 is so formed that the central portion protrudes upward. An annular lower spacer 51 is mounted on the outer edge portion of the lower support member 50, and a circular wire mesh 52 is mounted on the lower spacer 51. Thus, a gap about the thickness of the lower spacer 51 between the lower support member 50 and the grid 52, and compressed air is smoothly flowed through the gap. The upper spacer 53 (which is the same member as the lower spacer) is mounted on the outer edge of the wire mesh 52, and a disk-shaped upper support member 54 is mounted on the upper spacer 53. Thus, a gap is also formed between the wire mesh 52 and the upper support member 54, and compressed air is smoothly flowed into the gap. The upper support member 54 is made of the same material as the lower support member 50, and has the same external dimensions and thickness, but does not have a protrusion 55 such as the lower support member 50. The wire mesh 52 is sandwiched between the protrusion 55 of the lower support member 50 and the center portion of the upper support member 54.

The above-mentioned second filter 38 is inserted into the recess 35*a* of the second valve member 33 and received from below by the stepped portion 37 of the second valve member 33. A fixing ring 56 is press-fitted and fixed into the recess 35*a* of the second valve member 33 from above the second filter 38, or is inserted into the recess 35*a* and fixed by plastic deformation of part of the inner peripheral wall of the recess 35*a*.

The above-mentioned coupling device, as shown in FIGS. 1 and 2, is connected and disconnected as follows. First, as shown in FIG. 1, the second block 2 is separated from the first block 1, and the coupling device is in a detached state. In the first joint 3 in the detached state, the first valve member 18 is urged toward the tip of the valve seat member 22 with respect to the partition wall 15 of the first casing 9 by the first valve-closing spring 24. Thus, the first valve surface 20 of the first valve member 18 is engaged with the first valve seat 23 of the valve seat member 22 to close the valve.

In the second joint 4 in the detached state, the second valve member 33 is urged downward toward the second valve seat 32 by the second valve-closing spring or sub valve member closing spring 40. Therefore, the second valve surface 41 of the second valve member 33 is engaged with the second valve seat 32 to close the valve. The third valve member 43 is urged downward toward the third valve seat 42 by the third valve-closing spring or main valve member closing spring 48. Therefore, the third valve surface 49 of the third valve member 43 is engaged with the third valve seat 42 to close the valve.

When the second block 2 is brought close to the first block 1 from the above-mentioned detached state in order to be connected, the receiving surface 26 of the plug portion 25 of the second joint 4 is first engaged with the sealing member 21 of the first joint 3. At this time, the second valve member 33 of the second joint 4 engages with the seat member 22 of the first joint 3. The plug portion 25 then moves the first valve member 18 downwardly against the urging force of the first valve-closing spring 24. Thereby, the first valve surface 20 is separated from the first valve seat 23 to open the valve. When the plug portion 25 is inserted into the first valve chamber 14, the second valve member 33 is received by the valve seat member 22, so that the second valve member 33 is left in an engaged position with the valve seat member 22 with respect to the plug portion 25. Thus, the second valve surface 41 is separated from the second valve seat 32 to open the valve. The third valve member 43 is then brought into contact with the second filter 38, and the third valve member 43 is received by the second valve member 33 via the second filter 38 and the support pin 36, so that the third valve member 43 is left in an engaged position with the second filter 38 with respect to the plug portion 25. Thus, the third valve surface 49 is separated from the third valve seat 42 to open the valve. Successively, the lower surface of the first casing 12 is received by the upper surface of the first casing 9, and the state in which the first joint 3 and the second joint 4 are separated as shown in FIG. 1 is switched to the connected state as shown in FIG. 2.

In the coupling device of the present embodiment, a switching valve (not shown) is provided in the middle of the flow passage 7 formed in the first block 1. The switching valve switches the state in which the coupling device and the compressed air supply source are connected to the state in which the coupling device and the discharge port are connected.

In the connected state of the coupling device shown in FIG. 2, when compressed air is supplied from the compressed air supply source to an actuator (not shown) via the coupling device, the compressed air flows as follows in the coupling device. First, the compressed air is flowed from the supply source into the supply/discharge port 13 of the first joint 3 through the flow passage 7. In turn, the compressed air is supplied to the first valve chamber 14 through the first filter 17 and the through holes 16. The compressed air in the first valve chamber 14 flows into the second valve chamber 27 through an open valve gap formed between the first valve surface 20 and the first valve seat 23 and an open valve gap formed between the second valve surface 41 and the second valve seat 32. The compressed air from the second valve chamber 27 is then supplied to the actuator through the second filter 38, the communication groove 31, the open valve gap formed between the third valve surface 49 and the third valve seat 42, and the third filter 47.

When the compressed air in the actuator is discharged to the outside, the switching valve switches the coupling device so that it communicates with the discharge port. Then, the compressed air in the actuator is discharged to the outside from the discharge port in the reverse order of the above-mentioned order.

The above-mentioned first embodiment provides the following advantages.

The recess 35*a* and the through hole 35*b* formed in the upper portion of the second valve member 33 constitute a part of the second supply/discharge passage 6. That is, a part of the second supply/discharge passage 6 is provided inside the second valve member 33. Therefore, the radial dimension of the second joint 4 of the present embodiment can be made smaller than that of the prior art in which a supply/discharge passage or a ring-shaped filter is provided outside the valve member.

Inside the second valve member 33, the second filter 38 is mounted on the recess 35*a* as a second supply/discharge passage 6. In this respect as well, the radial dimension of the second joint 4 in the present embodiment can be made smaller than in the prior art in which a ring-shaped filter is provided on the outer peripheral side of the valve chamber.

Here, the above-mentioned conventional coupling device includes a ring-shaped thin filter having an opening at the center. In such a case, in order to prevent the function of the filter from deteriorating due to gaps created when the filter is pushed by the pressure of the compressed air, inner and outer edge portions of the filter opening must be pressed to be fixed. Therefore, since the compressed air cannot flow through the opening and the inner and outer peripheral edge portions of the filter, the filter should be sufficiently wide in the radial outward direction. In contrast, in the second joint 4 of the present embodiment, the outer peripheral edge portion of the second filter 38 is supported by the stepped portion 37 of the second valve member 33, and the central portion of the second filter 38 is supported by the support pin 36 of the second valve member 33. Therefore, although the compressed air does not flow through the contact portion between the outer peripheral edge portion and the support pin 36, the compressed air flows through portions other than the outer peripheral edge portion and the contact portion, so that an area through which the compressed air can flow can be widened by an amount of pressing margin of the inner peripheral edge portion as compared with the prior art. Thus, the second filter of the present embodiment can be made smaller in the radial direction than the ring-shaped filter of the prior art. Thus, the overall dimensions of the coupling device can be made small.

The protrusion 55 is formed at the center of the lower support member 50 of the second filter 38, so that the wire mesh 52 is sandwiched by the protrusion 55 and the central portion of the upper support member 54. That is, the wire mesh 52, the protrusion 55, and the central portion of the upper support member 54 are in contact with each other so that there is no gap between these members, or they are so close to each other that there is almost no gap between them. Thus, when the second valve member 33 pushes the third valve member 43 upward and downward via the support pin 36 and the second filter 38, the members constituting the filter 38 are less likely to be bent or returned by the third valve member 43 and the support pin 36, so the second filter 38 is prevented from being damaged or worn by the repeated or alternated load.

The lower spacer 51 is mounted between the wire mesh 52 and an outer edge portion of the lower support member 50, and the upper spacer 53 is mounted between the wire mesh 52 and the upper support member 54. Thus, a space is formed between the wire mesh 52 and the lower support member 50 or between the wire mesh 52 and the upper support member 54, through which compressed air flows. Even if the hole position of the lower support member 50 and the hole position of the upper support member 54 are shifted in a horizontal direction, the compressed air from the hole of the lower support member 50 surely flows into the hole of the upper support member 54 through the above-mentioned space and the wire mesh 52, etc.

The third valve member 43 is inserted into a chamber partitioned by the second filter 38, the second valve member 33, the second valve chamber 27, the third valve chamber 28 and the third filter 47. Thus, foreign matter such as dust contained in the compressed air from the supply source is removed by the first filter 17, and foreign matter contained in the compressed air from the actuator is removed by the second filter 38 and the third filter 47. Thus, when the second joint is closed, leakage of fluid due to foreign matter trapped between the third valve face and the third valve seat of the third valve member is prevented.

Figure 4:
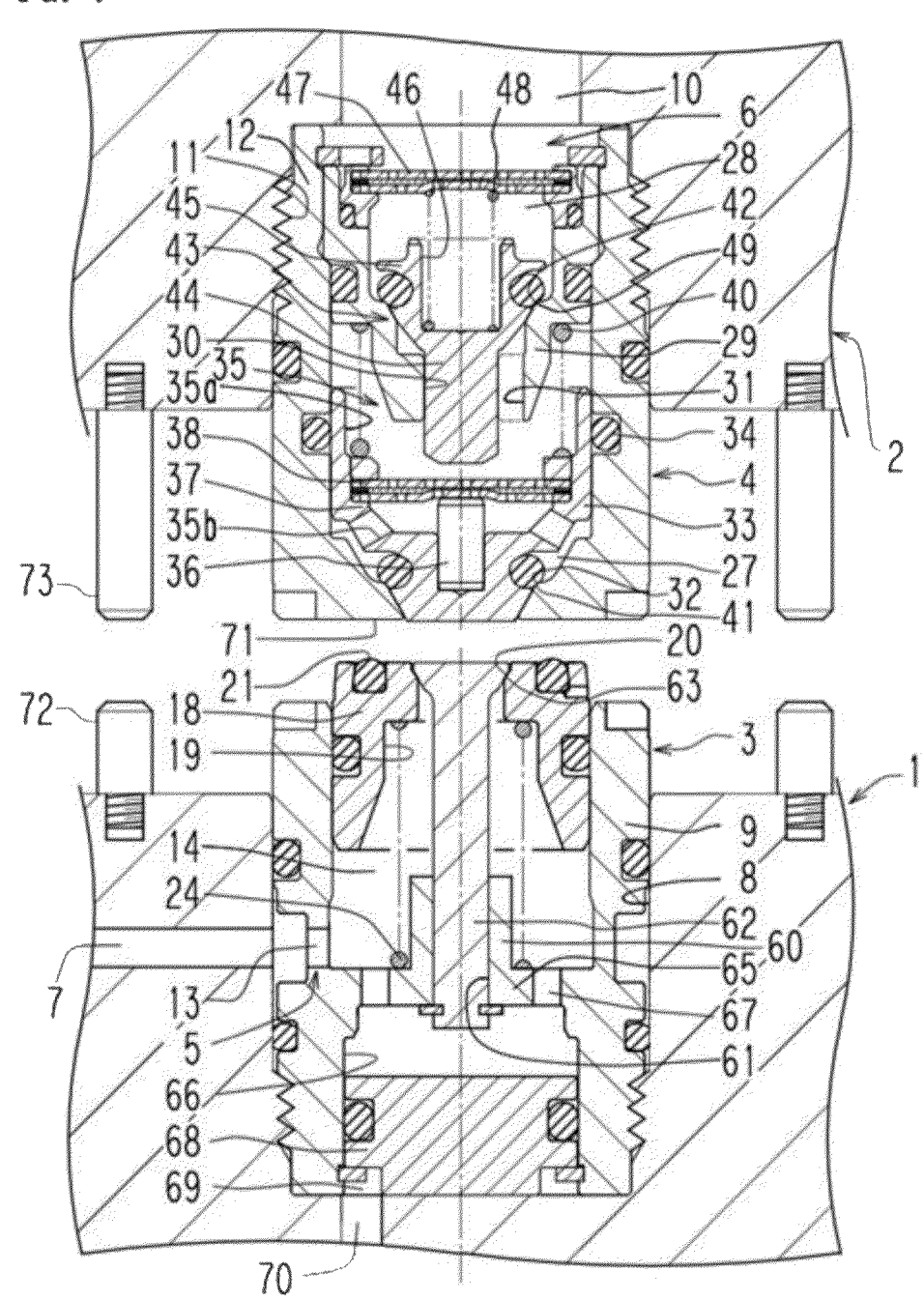
FIG. 4 is a cross-sectional view of a second preferred embodiment of the present invention in which a first joint and a second joint of a coupling device are separated.
Figure 5:
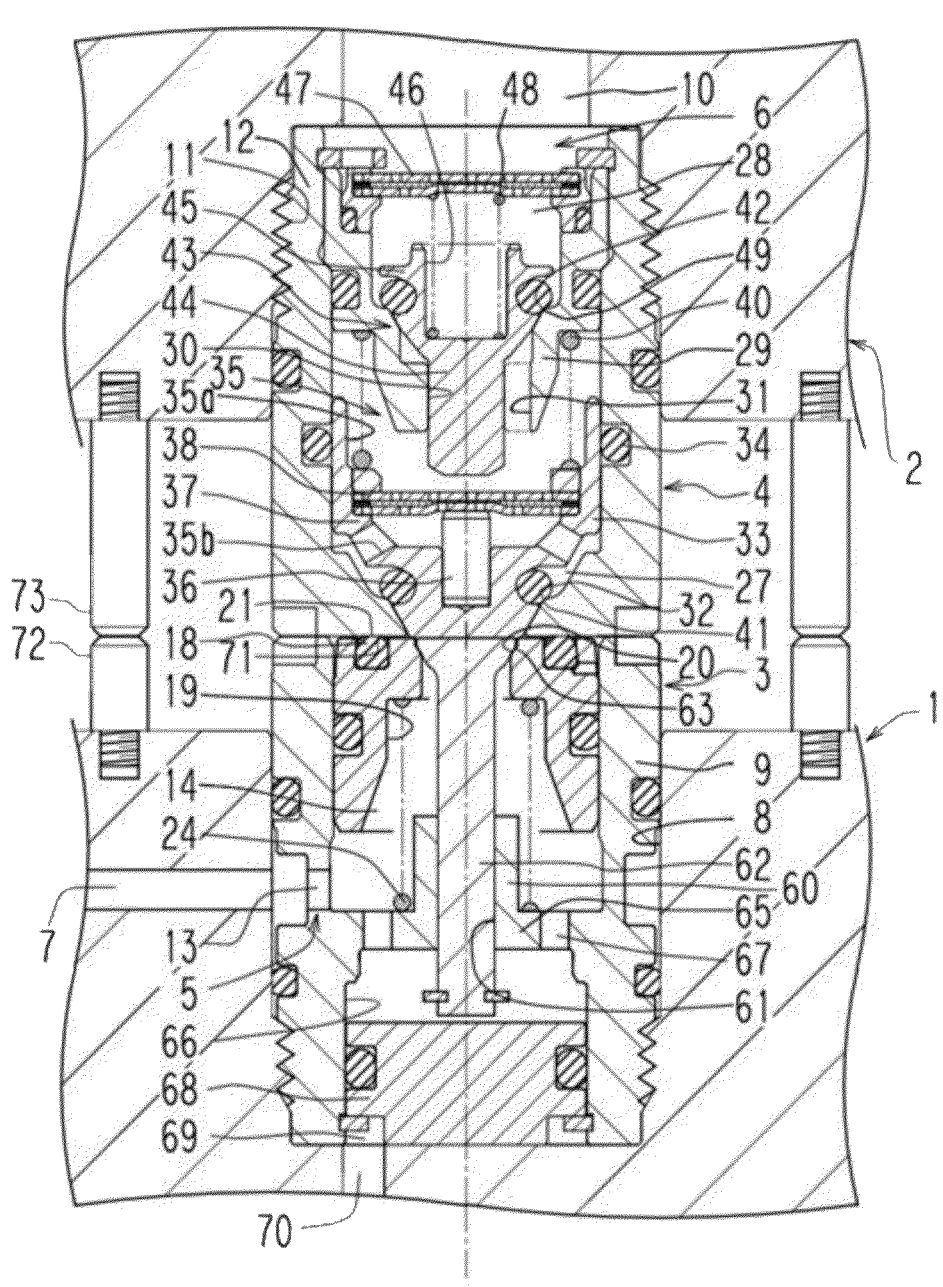
FIG. 5 is a cross-sectional view showing a state in which a first joint and a second joint of a coupling device are in contact with each other, and is similar to FIG. 4.
Figure 6:
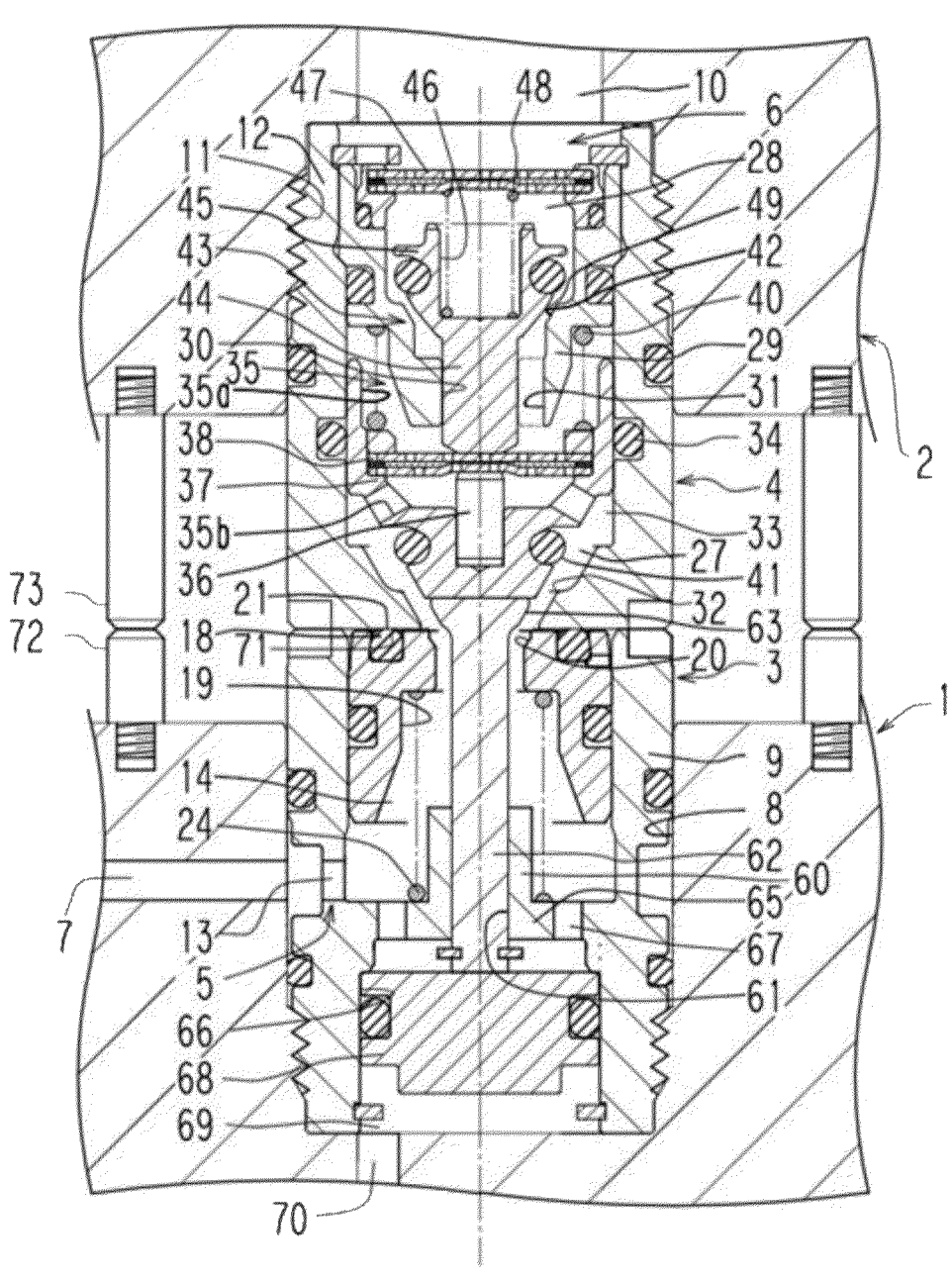
FIG. 6 is a cross-sectional view showing a state in which a first joint and a second joint of a coupling device are connected, and is similar to FIG. 4.

FIGS. 4 to 6 show the second embodiment of the present invention. In the second embodiment, the same members (or similar member) as the components of the above-mentioned first embodiment are described in principle with the same reference numerals.

The second embodiment differs from the first embodiment in the following points.

In the coupling device of the second embodiment, three grooves are circumferentially formed on the outer peripheral wall of the first casing 9 of the first joint 3 at different heights, and sealing members are mounted in the uppermost and lowermost grooves of the three grooves. The first flow passage 7 formed in the first block 1 is communicated with the middle groove of the three grooves. The supply/discharge port 13 is constituted by a hole opened to the bottom surface of the middle groove. The supply/discharge port 13 is communicated with the first valve chamber 14 formed on the upper portion of the first casing 9. In this embodiment, although the first filter 17 is omitted, the first filter 17 may be provided so as to cover the supply/discharge port 13.

A support cylinder 60 protrudes from the bottom wall of the first valve chamber 14, and a valve seat member 62 is inserted into a cylindrical hole 61 of the support cylinder 60 so as to be movable vertically. A mounting groove is formed in the lower portion of the valve seat member 62, and a retaining ring is mounted on the mounting groove as a stopper. The retaining ring prevents the valve seat member 62 from slipping upward from the cylindrical hole 61 of the support cylinder 60. In addition, the upper portion of the valve seat member 62 is formed in a tapered shape so as to widen upward. A first valve seat 63 is circumferentially formed on the tapered surface of the valve seat member 62. The first valve surface 20 is capable of coming into contact with the first valve seat 63. The first valve-closing spring 24 is mounted between the bottom wall of the first valve chamber 14 and the cylindrical first valve member 18, and the first valve-closing spring 24 urges the first valve member 18 upward toward the tip of the valve seat member 62.

A cylinder hole 66 is formed across a partition wall 65 that is formed on the lower side of the first valve chamber 14. A through hole 67 is formed in the partition wall 65, and the through hole 67 communicates the first valve chamber 14 and the cylinder hole 66. A piston 68 is inserted into the cylinder hole 66 so as to be movable vertically in a sealed manner. An operation chamber 69 is formed below the piston 68, and the compressed air from the supply source is supplied into and discharged from the operation chamber 69 through a supply/discharge passage 70 formed on the first block 1. In this embodiment, the first supply/discharge passage 5 is composed of the supply/discharge port 13 of the first casing 9, the first valve chamber 14, and the cylindrical hole 19 of the first valve member 18. In this embodiment, although the piston 68 and the valve seat member 62 are configured as separate members, they may be formed integrally.

In the second joint 4 of this embodiment, a receiving surface 71 is formed on the lower surface of the second casing 12. The receiving surface 71 is capable of coming into contact with the sealing member 21 mounted on the first valve member 18 of the first joint 3. In the second joint 4 of the present embodiment, the plug portion 25 of the second joint 4 of the first embodiment is omitted.

The above-mentioned coupling device is connected and detached as shown in FIGS. 4 to 6. First, in the detached state of the coupling device shown in FIG. 4, in the first joint 3, the first valve-closing spring 24 pushes the first valve member 18 upward, and the first valve member 18 pushes the valve seat member 62 to the upper limit position. Thus, the first valve surface 20 of the first valve member 18 is engaged with the first valve seat 63 of the valve seat member 62 to close the valve.

In the second joint 4 in the detached state, the second valve-closing spring 40 pushes the second valve member 33 downward toward the second valve seat 32. Therefore, the second valve surface 41 of the second valve member 33 is engaged with the second valve seat 32 to close the valve. The third valve-closing spring 48 urges the third valve member 43 downward toward the third valve seat 42. Therefore, the third valve face 49 of the third valve member 43 is engaged with the third valve seat 42 to close the valve.

When the second block 2 is brought closer to the first block 1 to be connected from the above-mentioned detached state, the receiving surface 71 of the second joint 4 is first engaged with the sealing member 21 of the first valve member 18 of the first joint 3. Then, as shown in FIG. 5, the second casing 12 moves the first valve member 18 downward against urging force of the first valve-closing spring 24, and the second casing 12 moves the valve seat member 62 downward via the second valve-closing spring 40 and the second valve member 33. At this time, the first valve surface 20 is engaged with the first valve seat 63 to maintain the closed state, and the second valve surface 41 is engaged with the second valve seat 32 to maintain the closed state. Thereafter, the second casing 12 is received by the first casing 9. Then, when the compressed air is supplied from the supply source into the operation chamber 69 through the supply/discharge passage 70, the piston 68 rises and comes into contact with the valve seat member 62. Subsequently, the piston 68 raises the second valve member 33 via the valve seat member 62 against the urging force of the second valve-closing spring 40. Thus, the first valve surface 20 is separated from the first valve seat 63 to open the valve, and the second valve surface 41 is separated from the second valve seat 32 to open the valve. Then, the second filter 38 mounted on the second valve member 33 engages with the third valve member 43. Thereafter, the piston 68 raises the third valve member 43 via the seat member 62, the second valve member 33, and the second filter 38. Thus, the third valve surface 49 is separated from the third valve seat 42 to open the valve. Thereafter, the piston 68 is received in a stepped portion formed in the inner peripheral wall of the cylinder hole 66. This switches the first joint 3 and the second joint 4 from the detached state shown in FIG. 4 to the connected state shown in FIG. 6.

A switching valve (not shown) provided in the middle of the supply/discharge passage 7 switches from a state in which the coupling device and the discharge port are connected to a state in which the coupling device and the compressed air supply source are connected. In turn, the compressed air is supplied from the supply source to an actuator (not shown) through the first supply/discharge passage 5 and the second supply/discharge passage 6 of the coupling device. At this time, the compressed air flows through the coupling device as follows. First, the compressed air is supplied from the supply source into the first valve chamber 14 through the flow passage 7 and the supply/discharge port 13, and the compressed air in the first valve chamber 14 is flowed into the second valve chamber 27 through an open valve gap formed between the first valve surface 20 and the first valve seat 63 and an open valve gap formed between the second valve surface 41 and the second valve seat 32. Then, the compressed air in the second valve chamber 27 is supplied into the actuator through the second filter 38, the communication groove 31, an open valve gap formed between the third valve surface 49 and the third valve seat 42, the third filter 47, and the flow passage 10.

When the compressed air in the actuator is discharged to the outside, the coupling device is switched to be connected to the discharge port by the switching valve. Then, the compressed air in the actuator is discharged to the outside from the discharge port in the reverse order of the above-mentioned order.

Each of the above-mentioned embodiments can be modified as follows.

The above-mentioned pressure fluid may be other gases or liquids such as pressure oil in place of the compressed air shown in the examples.

Instead of the lower surface of the second casing 12 being received by the upper surface of the first casing 9, as shown in FIG. 4, the supported member 73 provided in the second block 2 may be received by the support member 72 provided on the first block 1.

Instead of the sealing member 34 being mounted in the accommodation groove formed circumferentially on the inner peripheral wall of the second valve chamber 27, the sealing member 34 may be mounted in the accommodation groove formed on the outer peripheral wall of the second valve member 33. In this case, the contact portion between the sealing member 34 and the inner peripheral wall of the second valve chamber 27 with which the sealing member 34 is in contact is called a sealing portion.

In addition, it is to be understood that various changes may be made in the scope which a person skilled in the art could assume.

DESCRIPTION OF SYMBOLS

3 first joint
4 second joint
5 first supply/discharge passage
6 second supply/discharge passage
27 second valve chamber (sub valve chamber)
28 third valve chamber (main valve chamber)

32 second valve seat (sub valve seat)
33 second valve member (sub valve member)
34 sealing member
35 communication path
36 support pin (support member)
38 second filter (filter)
40 second valve-closing spring or sub valve member closing spring
41 sub valve surface (second valve surface)
42 third valve seat (main valve seat)
43 third valve member (main valve member)
48 third valve-closing spring or main valve member closing spring

The invention claimed is:

1. A coupling device comprising:
a first joint;
a second joint detachably connected to the first joint;
a first supply/discharge passage provided in the first joint;
a second supply/discharge passage provided in the second joint and detachably connected to the first supply/discharge passage;
a sub valve chamber and a main valve chamber formed so as to be continuous from a distal end side to a proximal side in an axial direction in the second joint;
a sub valve member inserted into the sub valve chamber so as to be movable in the axial direction via a sealing member in a sealed manner, urged to the distal end side toward a sub valve seat formed in the sub valve chamber by a sub valve member closing spring, and having a sub valve surface capable of coming into contact with the sub valve seat; and
a main valve member inserted into the main valve chamber so as to be movable in the axial direction in a sealed manner, capable of coming into contact with the sub valve member, and urged to a distal end side toward the main valve seat formed in the main valve chamber by a main valve member closing spring,
wherein a communication path is formed in the sub valve member as a part of the second supply/discharge passage, and a filter is mounted so that at least a portion of said filter is disposed in a middle of the communication path.

2. The coupling device as claimed in claim 1,
wherein said filter is a disk-shaped filter and a support member protruding from a wall surface of the communication path supports the disk-shaped filter, and the sub valve member is capable of coming into contact with the main valve member through the support member and the filter.

3. The coupling device as claimed in claim 1,
wherein one end of the communication path is opened between the sub valve surface and a portion sealed by the sealing member on an outer peripheral surface of the sub valve member, and other end of the communication path is communicated to the sub valve chamber between the sub valve member and the main valve member.

4. The coupling device as claimed in claim 3,
wherein said filter is a disk-shaped filter and a support member protruding from a wall surface of the communication path supports the disk-shaped filter, and the sub valve member is capable of coming into contact with the main valve member through the support member and the filter.

\* \* \* \* \*